United States Patent
Penfold

(10) Patent No.: US 6,373,057 B1
(45) Date of Patent: Apr. 16, 2002

(54) INFRARED REFLECTIVE ARTICLE COUNTING/DETECTING DEVICE

(75) Inventor: Barry Penfold, Divernon, IL (US)

(73) Assignee: DICKEY-john Corporation, Auburn, IL (US)

(*) Notice: Subject to any disclaimer, the term of this patent is extended or adjusted under 35 U.S.C. 154(b) by 0 days.

(21) Appl. No.: 09/159,213

(22) Filed: Sep. 23, 1998

(51) Int. Cl.[7] .................................................. G08B 21/00
(52) U.S. Cl. .................. 250/341.8; 250/221; 250/222.1
(58) Field of Search .......................... 250/341.8, 221, 250/222.1, 222.2, 214 R

(56) References Cited

U.S. PATENT DOCUMENTS

| | | |
|---|---|---|
| 3,834,806 A | 9/1974 | Whited |
| 3,855,953 A * | 12/1974 | Fathauer |
| 3,880,289 A * | 4/1975 | Gray |
| 3,912,121 A * | 10/1975 | Steffen |
| 3,927,400 A * | 12/1975 | Knepler |
| 4,054,779 A | 10/1977 | Wilke |
| 4,141,390 A * | 2/1979 | Arnold |
| 4,157,468 A | 6/1979 | Primiano |
| 4,166,948 A * | 9/1979 | Steffen ..................... 250/222.1 |
| 4,207,466 A | 6/1980 | Drage et al. |
| 4,268,825 A | 5/1981 | Kaplan |
| 4,441,513 A | 4/1984 | Herwig |
| 4,555,624 A * | 11/1985 | Steffen |
| 4,605,922 A * | 8/1986 | Blattman et al. .......... 340/552 |
| 4,634,855 A | 1/1987 | Friend et al. |
| 4,635,215 A | 1/1987 | Friend |
| 4,713,781 A * | 12/1987 | Brizgis et al. |
| 4,851,746 A | 7/1989 | Milke |
| 5,103,085 A | 4/1992 | Zimmerman |
| 5,206,500 A * | 4/1993 | Decker et al. .......... 250/214 R |
| 5,354,052 A | 10/1994 | Nicholls et al. |
| 5,355,149 A * | 10/1994 | Casebolt ..................... 250/221 |
| 5,548,119 A | 8/1996 | Nortier |
| 5,585,626 A * | 12/1996 | Beck et al. |
| 5,635,911 A | 6/1997 | Landers et al. |
| 5,650,609 A | 7/1997 | Mertins et al. |
| 5,988,645 A * | 11/1999 | Downing ..................... 273/348 |

FOREIGN PATENT DOCUMENTS

| | | |
|---|---|---|
| DE | 2652021 | 5/1978 |
| DE | 2704184 | 8/1978 |
| DE | 8806279 | 8/1988 |
| FR | 2293698 | 7/1976 |
| GB | 2013330 | 8/1979 |

* cited by examiner

Primary Examiner—Constantine Hannaher
Assistant Examiner—Otilia Gabor
(74) Attorney, Agent, or Firm—Katten Muchin Zavis

(57) ABSTRACT

A proximity sensor with an emitter capable of emitting energy waves of a selected wavelength and a detector capable of detecting energy waves with the selected wavelength, for example, energy waves in the infrared spectrum. The emitter and the detector are located in close proximity to one another on a single printed circuit board. When an article to be detected (e.g., any seed used in agriculture) passes the proximity sensor, the energy waves emitted by the emitter are reflected off the article and detected by the detector. The proximity sensor can be attached to a single wall of a container or to the side of a chute in order to detect the presence of articles in the container or to detect the passage of articles through the chute.

21 Claims, 6 Drawing Sheets

SECTION A-A

INFRARED REFLECTIVE ARTICLE COUNTING/DETECTING DEVICE

FIELD OF THE INVENTION

This invention relates to a proximity sensor for detecting the presence of or counting articles, and more particularly, to an infrared proximity sensor for detecting the presence of or counting seeds in a container or as they pass through a chute.

BACKGROUND OF THE INVENTION

In many situations, it is necessary to detect the presence of an article in a container or to count the number of articles passing through a chute, tube or passageway. The detection and counting of articles is particularly important in agriculture, e.g., when planting seeds. In the modern agricultural setting, the farmer uses a planting machine to plant seeds in the soil. Such a machine generally includes a container for holding the seeds to be planted, and also includes at least one tube or chute, through which the seeds travel before being placed into the soil. It is desirable and necessary to detect the presence of seeds in the container or to count the number of seeds passing through the chute on their way to being planted in the soil. By being able to detect the presence of seeds in the container, the farmer is able to automatically determine when the seed-holding container is empty, and thus determine when the container needs to be refilled with more seed. Similarly, by being able to detect and/or count the seeds as they travel through the chute, the farmer is able to count the number, and frequency at which, the seeds are being planted and also detect if a blockage has occurred that is interfering with the seed planting process.

The use of detection and/or counting devices in the agricultural setting is generally known. These devices, however, use light beam-breaking technology to detect and/or count seeds. Specifically, these devices generally use an optical emitter, such as a light emitting diode (LED), positioned across from an optical detector, such as a photodiode. For example, the LED is attached to one wall of the container or the chute, and the photodiode is attached to the opposite wall of the container or the chute. The photodiode detects the light that is emitted by the LED. When a seed travels between the LED and the photodiode, the beam of light is interrupted. This interruption is generally interpreted by the detector as a seed (or other article that is to be detected). U.S. Pat. No. 4,268,825 to Kaplan, U.S. Pat. No. 5,635,911 to Landers et al., and U.S. Pat. No. 4,634,855 to Friend et al. are representative references that teach the use of such technology to detect and count the presence of seeds in a container or as they pass through a chute.

The use of light beam-breaking technology to detect and/or count seeds in a container and/or chute has several distinct disadvantages and shortcomings. As stated above, the emitter and the detector must be placed opposite one another and are usually attached to opposite walls of a container. In many instances, however, it is not possible to place the emitter and detector on opposite walls of a container because, for example, the seed holding container in the seed planting machine may include moving parts inside or on its walls such that only one wall is available for attaching sensor devices. Because the emitter and the detector must be placed across from one another, it is impractical or impossible to place a beam-breaking-type article counting/detecting device in such a container.

Another disadvantage of the known article counting devices is the complexity of such devices. Because the emitter and the detector are placed on opposite sides of a container or a chute, the two devices must somehow be connected to one another and/or to additional circuit components, usually by a wire. Physically connecting the emitter and the detector once they have been placed on the opposite sides of the container and/or chute requires extra manufacturing effort and increases production costs. Additionally, the extra wiring makes installation more difficult and increases the risk of damage to the detecting device, which increases warranty and repair costs. For example, the extra wiring connecting the emitter to the detector is easy to snag and break during shipping, handling and use. Thus, extra effort must be expended to protect the wires. Additionally, if a user needs to replace the emitter and/or detector, the user must be extra cautious to prevent inadvertent damage to the wires connecting the emitter to the detector.

Available commercially are infrared (IR) reflective detector products, which consist of an emitter, a detector and associated circuitry within a single package (referred to as a "photo/reflective pair"). With these products, infrared light emitted by the emitter is detected by the detector after having been reflected by an object. These products can detect various articles and can be incorporated into larger and more complex circuit designs. It has been found, however, that these off-the-shelf, reflective detector products are incapable of detecting all the different sizes and speeds that are used in agriculture (e.g., canola seeds traveling at 30 miles per hour) and also are incapable of detecting seeds that are in close proximity to or immediately in front of the emitter or the detector.

SUMMARY OF THE INVENTION

In view of the foregoing, it is a general aim of the present invention to provide a proximity sensor that is capable of detecting and/or counting articles in a container or passing through a chute in which an emitter and a detector do not have to be located opposite one another.

It is another object of the invention to provide a proximity sensor capable of detecting and/or counting articles in a container or passing through a chute that uses infrared technology.

Yet another object of the invention is to provide a proximity sensor that uses an infrared emitter and an infrared detector that is capable of detecting and/or counting any size and shape seed used in agriculture that is in a container or passing through a chute.

It is a feature of the invention to provide a proximity sensor that is capable of detecting and/or counting articles in a container or passing through a chute in which an emitter and a detector can be located on a single printed circuit board.

Another object of the invention is to provide a proximity sensor that is capable of detecting and/or counting articles in a container or passing through a chute even when the article is located immediately in front of the emitter and/or detector.

A further object of the present invention is to provide a proximity sensor that is capable of detecting and/or counting articles in a container or passing through a chute when the detector and the emitter are separated from the articles by a non-focusing lens.

It is a more particular object of the invention to provide a proximity sensor the performance of which is not affected by the presence of sunlight or fluorescent light sources.

Yet another object of the present invention is to provide a proximity sensor that is capable of using a focusing lens to increase the detection range of the device without increasing the power requirements of the device.

A specific object of the present invention is to provide a detector for detecting the presence of seeds in a container which relies on infrared light and therefore is not affect by moisture.

It is another object of the present invention to provide a proximity sensor in which the detection range and the size and shape of the articles that can be counted and/or detected can be varied by varying the distance and/or angle between the emitter and the detector and/or by changing the frequency of the wavelengths that are emitted or detected.

These and other objects and features are achieved according to the present invention, in which infrared (IR) technology is used to detect and/or count seeds in a container or passing through a chute. An infrared light emitting diode (IR emitter) and an infrared photodiode or infrared phototransistor (IR detector) are placed on a single printed circuit board (pcb). A seed or other article that is in front of, or passes by, the IR emitter will reflect some or all of the radiation from the emitter. The IR detector will detect some or all of the reflected radiation and provides an output that can be interpreted as a count or the presence of a seed or other article. By placing all the components of the detector on a single pcb, one is able to manufacture a self-contained device which can be placed in a container even when the container only has one wall available for placing sensors. Additionally, the above mentioned disadvantages associated with having to run a wire between the emitter and the detector are eliminated. The detector of the present invention, therefore, is easier and less expensive to produce and is less likely to be damaged or require repair or replacement.

Furthermore, the present invention includes a proximity sensor with an emitter capable of emitting energy waves of a selected wavelength and a detector in close proximity to the emitter capable of detecting energy waves with the selected wavelength. The proximity sensor also includes a phase lock loop integrated circuit for driving the emitter at a preselected frequency. When an article to be detected passes the proximity sensor, the energy waves emitted by the emitter are reflected off the article and detected by the detector. As a result of detecting the energy waves with the selected wavelength, the detector outputs a signal which is modulated at the same preselected frequency as the output of the emitter. When the frequency of the output signal received from the detector matches the frequency at which the emitter is driven, the phase lock loop integrated circuit outputs a signal that may be used by a monitoring device to detect, count and/or monitor the articles.

Other objects and advantages will become apparent from the following detailed description when taken in conjunction with the drawings, in which:

DETAILED DESCRIPTION OF THE INVENTION

Figure 1:
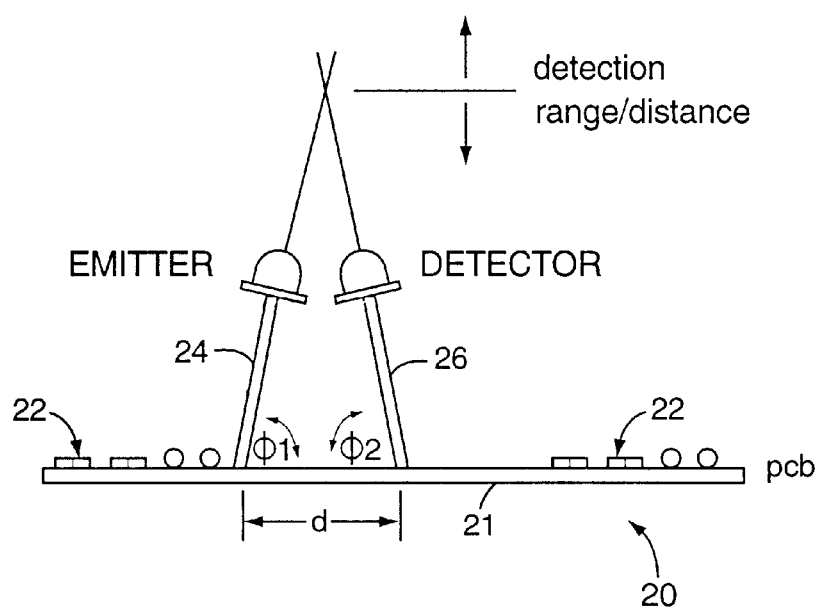
FIG. 1 is a diagrammatic representation of the proximity sensor according to the invention.

Turning to FIG. 1, there is shown a general diagrammatic representation of the proximity sensor 20 according to the invention. The proximity sensor 20 is generally comprised of a printed circuit board 21 with various circuit components 22 and an emitter 24 and a detector 26. Throughout this description, the emitter and the detector may individually or collectively also be referred to as the sensor(s). Preferably, the emitter 24 is an infrared light emitting diode (IR LED) or similar device for emitting light waves in the infrared spectrum (i.e., 800 nm to 1500 nm) and the detector 26 is an infrared photodiode or similar device capable of detecting light in the infrared spectrum. The detector 26, however, can be any device capable of detecting light in the infrared spectrum. For example, the detector 26 can also be an infrared phototransistor instead of an infrared photodiode.

The proximity sensor 20 according to the invention, and generally shown in FIG. 1, operates as follows. The emitter 24 generates energy waves at a preselected wavelength, preferably in the infrared spectrum. If there is not any articles (e.g., seeds) in the vicinity of the emitter 24 then the energy waves generated by the emitter are eventually dissipated. If, on the other hand, there is a seed in the vicinity of the emitter, then the energy waves generated by the emitter are reflected off the seed and return towards the detector 26. The detector 26 is chosen such that it can detect energy waves at the same preselected wavelength generated by the emitter 24. It is to be understood, however, that the invention is not limited to emitters and detectors in the infrared spectrum. Rather, the principles of the invention can be implemented with emitters and detectors in any energy spectrum that can successfully be reflected off the articles to be detected, (e.g., any size and shape seed used in agriculture).

Still referring to FIG. 1, the detection range and the size and variety of seeds that may be detected by the proximity sensor 20 may be varied by changing the distance d between the emitter 24 and the detector 26 (as measured from the centerline of the emitter to the centerline of the detector), and/or changing the angles $\phi 1$ and $\phi 2$ between the emitter 24 and the detector 26, respectively, and the circuit board 21. By varying the distance d and the angles $\phi 1$ and $\phi 2$, the detection range of the proximity sensor can be adjusted from immediately in front of the sensors to any distance beyond the sensors. Adjusting d, $\phi 1$ and $\phi 2$ also changes the size and shape of the articles that may be detected by the proximity sensor. Generally, as the distance d increases, the detector becomes less sensitive to smaller articles. Similarly, as the angles $\phi 1$ and $\phi 2$ are made smaller (i.e., more acute), the detector is better able to detect articles closer to it.

Figure 2A:
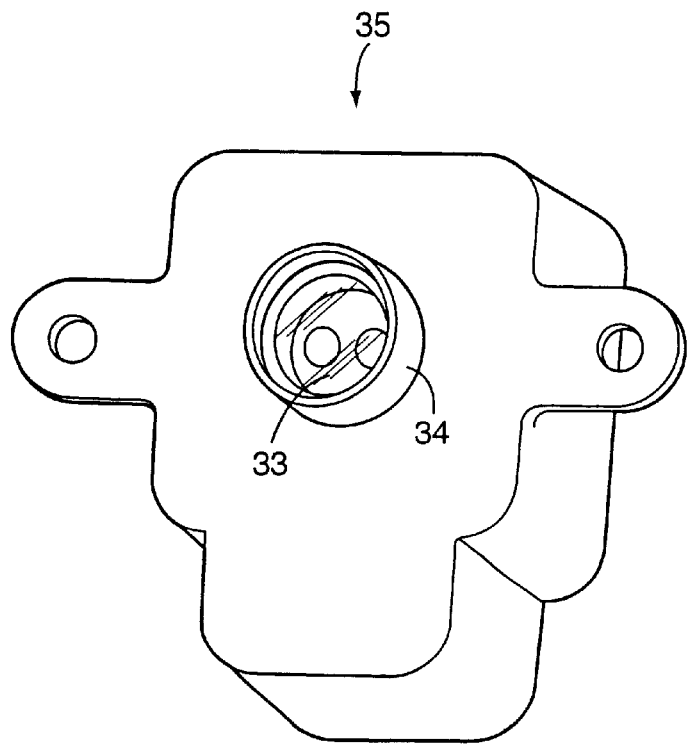
FIGS. 2a and 2b are a front and rear view, respectively, of a housing for the proximity sensor to enable the proximity sensor to be attached to one side or wall of a container for detecting the presence of articles in the container.
Figure 2B:
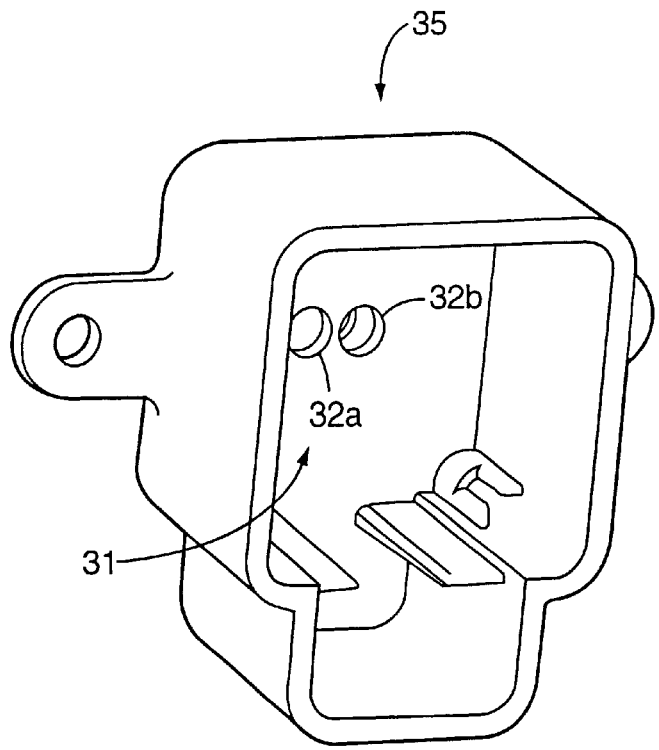

The proximity sensor according to the invention can be enclosed within a protective housing to reduce the likelihood of damage to the detector. FIGS. 2a and 2b are a front and rear view, respectively, of a housing 35 that may be used with the proximity sensor 20 to protect the proximity sensor from damage and to allow the proximity sensor to be attached to one side or wall of a container. The printed circuit board 21 is placed in the cavity 31, while the emitter 24 and detector 26 can emit and detect through the holes 32a and 32b.

When the proximity sensor is enclosed within a housing such as housing 35, however, several other design and manufacturing considerations must be taken into account. If a housing is used to enclose the proximity sensor, then one also has the option of interposing a non-focusing lens between the sensors and the articles (e.g., seeds) to be detected. A non-focusing lens is defined as a lens that is interposed between the sensors and the articles to be detected, but which does not help focus light (of any wavelength) on the sensors, i.e., the non-focusing lens does not alter the detection range of the sensors. In the housing shown in FIG. 2a, for example, a non-focusing lens 33 can be placed on the cylindrical wall 34 to protect the emitter and the detector.

If a non-focusing lens is used, such as a plastic sheet, then the angles $\phi 1$ and $\phi 2$ and the distance d between the emitter 24 and the detector 26 must be adjusted to arrange the detection region of the proximity sensor beyond the non-focusing lens, because there is a small index of refraction associated with what looks like "clear" plastic. If the detection region of the proximity sensor is not appropriately adjusted in this manner, then there is the possibility that the proximity sensor will actually detect the lens rather than the seeds that are contained beyond, or traveling past, the lens. By appropriately adjusting the detection region of the proximity sensor, the possibility of false identifications are reduced or eliminated.

It is also to be understood that the non-focusing lens may, if desired, be a filtering lens. That is, the lens may be configured or coated to allow transmission of light within a narrow band including the wavelength of light generated by the emitter. For example, the outside surface of the lens may be coated with a material that blocks the passage of all light through the lens except those light in the infrared spectrum. In this manner, the sensors in the proximity sensor may be isolated from other light sources that may be present, e.g., sunlight or fluorescent light. Of course, if the emitter 24 and detector 26 emit and detect energy waves in a spectrum other than the infrared spectrum, then the lens will have to be appropriately coated to allow only energy waves of the emitted and detected wavelength through.

Figure 3A:
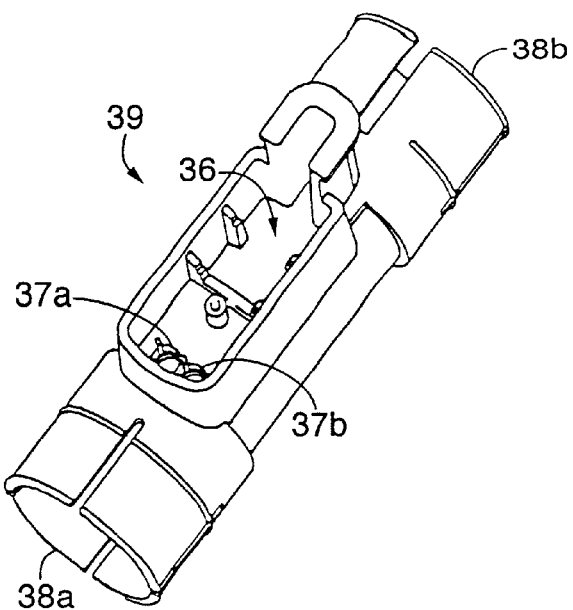
FIGS. 3a and 3b are a perspective and top view, respectively, of a housing for the proximity sensor to enable the proximity sensor to detect or count articles as they pass through a chute.
Figure 3B:
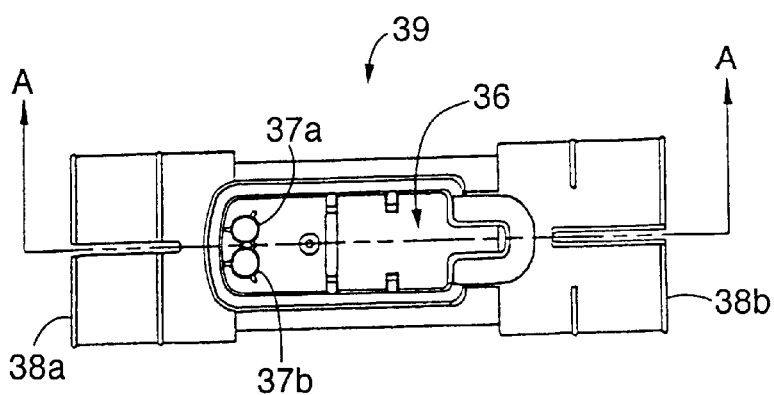

FIGS. 3a and 3b are a perspective and top view, respectively, of an alternative housing 39 for holding and protecting the proximity sensor 20 according to the invention. The housing 39 may be used in an agricultural seed planting machine to enable the proximity sensor 20 to detect and/or count seeds as they travel along a chute before they are planted in the ground. The proximity sensor 20 is located in the cavity 36 in such a manner to enable the emitter 24 and the detector 26 to emit and detect through the holes 37a and 37b. The chute along which the seeds travel can be cut, and the cut ends attached to the ends 38a and 38b of the housing 39 to enable the proximity sensor 20 to detect and/or count seeds as they travel along the chute.

Figure 4:
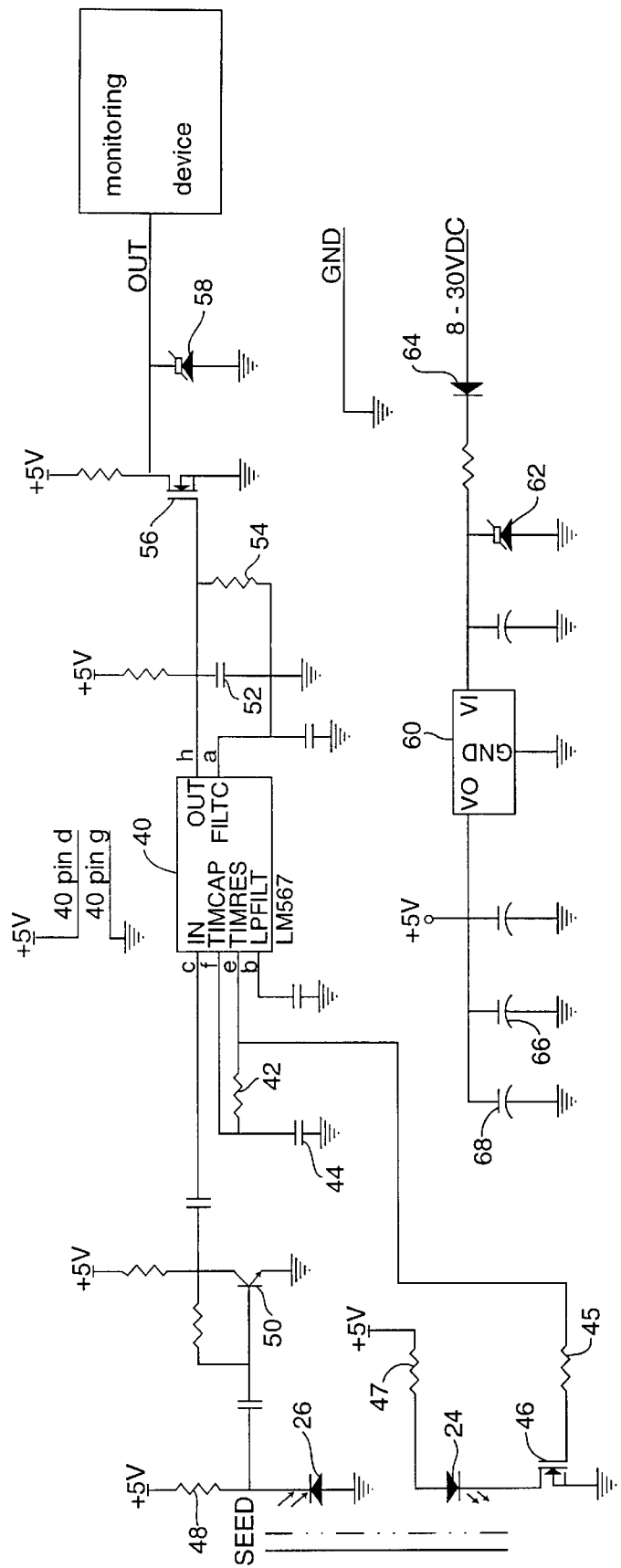
FIG. 4 is a circuit diagram of the preferred embodiment of the proximity sensor according to the invention.

Turning to FIG. 4, a circuit diagram for the preferred embodiment of the proximity sensor according to the invention is shown. The proximity sensor shown in FIG. 4 can be used to detect seeds or articles that are stationary, or seeds or articles that are moving. Thus, the detector shown in FIG. 4 can be placed in a container to indicate when the container no longer contains any seeds or articles. Alternatively, the proximity sensor shown in FIG. 4 may be attached to the side of a chute to detect seeds or articles as they pass by the detector. For example, when used in this alternative manner, and combined with a monitoring device (which may be a computer, a processor, additional circuitry, etc.), the proximity sensor can be used to determine the number of seeds being planted, the frequency with which seeds are being planted or whether a blockage is preventing seeds from being planted. When designing such a detector, one must properly adjust the distance d, the angles $\phi 1$ and $\phi 2$, and the amount of power provided to the sensors to ensure that the proximity sensor does not inadvertently detect the opposite wall of the container or chute.

Figure 3C:
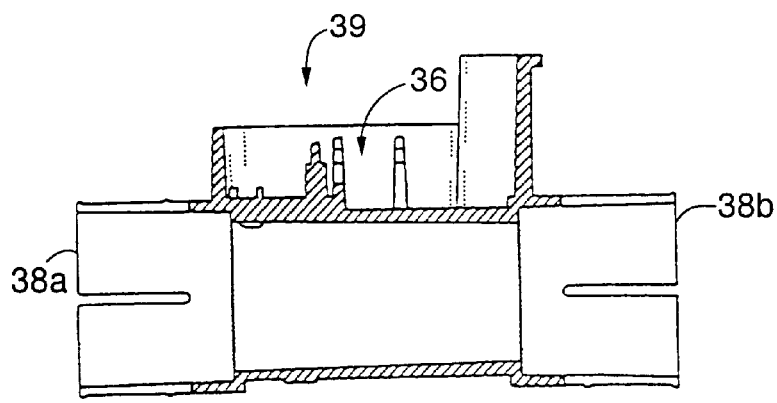
FIG. 3c is a cross sectional view of the housing of FIG. 3b along the axis A—A.

The emitter 24 can be any emitter that is capable of emitting lightwaves in any wavelength that will be suitably reflected off of the article (e.g., seeds) to be detected. In the preferred embodiment of the invention, the emitter 24 is an IR LED that emits infrared light with a wavelength of 940 nm, for example, model SFH409-2 manufactured by Siemens. The detector 26, respectively, is any suitably matched photodiode that can detect lightwaves with the wavelength emitted by the emitter 24. In the preferred embodiment of the invention, therefore, the detector is an infrared photodiode capable of detecting lightwaves with a wavelength of 940 nm, for example, model SFH229FA manufactured by Siemens. Such emitters and detectors are also manufactured by other companies, for example, LITE-ON and Optoelectronics. Alternatively, the detector 26 may be a two-pin npn phototransistor matched to the same wavelength as the emitter 26. If a phototransistor is used instead of a photodiode, the collector of the phototransistor should be connected to ground and the emitter of the phototransistor should be connected to the resistor 48. A photodiode is preferred to a phototransistor as the detector in the circuit of FIG. 3 because a photodiode has the capability to withstand a larger reverse biased voltage than the phototransistor.

The proximity sensor 20 shown in FIG. 4 operates as follows. The phase lock loop integrated circuit 40 outputs a square wave signal at pin e, the frequency of which is set by selecting the values of the resistor 42 and the capacitor 44. In the preferred embodiment of the invention, the values of resistor 42 and the capacitor 44 are set such that the integrated circuit 40 outputs a 10 KHz, 50% duty cycle square wave at pin e. One advantage of operating the circuit at 10 KHz is that the operation of the circuit is not affected by the presence of ambient light. The square wave output at pin e is connected to the gate of field effect transistor (FET) 46 through the resistor 45. The resistor 45 is not necessary, but serves to limit the current to the gate of FET 46 as its gate capacitance charges. The drain of the FET 46 is connected to the emitter 24 while the source of the FET 46 is connected to ground. In this manner, whenever the value of the square wave output by the IC 40 is low, the gate of the FET 46 is also low, which means that FET 46 is "off" and acting as an open circuit. When FET 46 is "on," the source of FET 46 is low and the emitter 24 emits infrared light waves of the preselected wavelength. Consequently, the emitter is turned on and off at a frequency of 10 KHz, but 180 degrees out of phase with respect to the square wave outputted by the phase lock loop integrated circuit 40.

The detector 26 is placed near the emitter 24. The distance d between the detector and the emitter and the angles $\phi 1$ and $\phi 2$ are adjusted appropriately to enable the proximity sensor to detect the desired shape and sized article (e.g., any size and shape seed used in agriculture) and to adjust the detection range of the proximity sensor. Additionally, the value of the resistor 47 can be changed to adjust the sensitivity and detection range of the proximity sensor. In the preferred embodiment of the invention, the distance d between the emitter 24 and the detector 26 is approximately 0.635 cm (i.e., approximately ¼") and the angles $\phi 1$ and $\phi 2$ are both 90 degrees (i.e., the emitter and detector are parallel to one another). When a 940 nm infrared emitter is arranged with a matching detector in this manner, the proximity sensor has the ability to detect any size and shape seed used in agriculture in quantities as few as one, even when the seed is immediately in front of the sensors of the proximity sensor. When the proximity sensor is used in conjunction with a lens, the distance d may need to be adjusted to ensure that the proximity sensor does not improperly detect the lens. For example, with the housing 35 shown in FIGS. 2a and 2b, the distance d will have to be adjusted by approximately 0.08 cm (i.e., approximately 1/32") to ensure that the proximity sensor does not improperly detect the lens.

If a seed is located near the sensors, or if a seed travels past the sensors, the infrared light from the emitter is reflected off the seed and is detected by the detector 26. When the detector 26 detects the reflected IR radiation, it outputs a corresponding signal which is fed to the transistor 50. The signal output by the detector 26 modulates at 10 KHz because the reflected IR radiation that it is detecting is modulating at 10 KHz. The transistor 50 is used to amplify the signal output by the detector 26 (in the preferred embodiment about 20 times) and is also used to phase shift the output of the detector by 180 degrees (thereby putting the output of the transistor 50 in phase with the output of the phase lock loop integrated circuit 40).

The output of the transistor 50 is input to pin c of the phase lock loop IC 40. When the phase lock loop integrated circuit 40 receives a 10 KHz square wave signal at pin c, it pulls the output of pin h to low. The capacitor 52 and the resistor 54 are used to apply hysteresis to the circuit so that the output of pin h does not oscillate when the article to be detected is brought to the border of the detection region of the proximity sensor. The output of pin h is connected to the gate of FET 56. When the output of pin h goes low, it causes the FET 56 to turn "off" and act as an open circuit. When FET 56 acts as an open circuit, its drain is high. The signal present at the drain of FET 56 can be used by a monitoring device such as a computer, a processor, another circuit, etc. to either acknowledge or count the presence or passage of seeds.

The integrated circuit 60 provides a steady 5V supply to the components of the circuit for a DC input of anywhere between 8V to 30V. The diode 64 protects the circuit against a voltage reversal and the tranzorbs 58 and 62 are used to protect against transient voltage spikes. The tranzorbs 58 and 62 have about a 1 pico second response time and, therefore, are preferable to using zener diodes, which have a response time of about a few microseconds. The capacitors 66 and 68 are used to minimize the 10 KHz noise on the 5V power lines.

Figure 5:
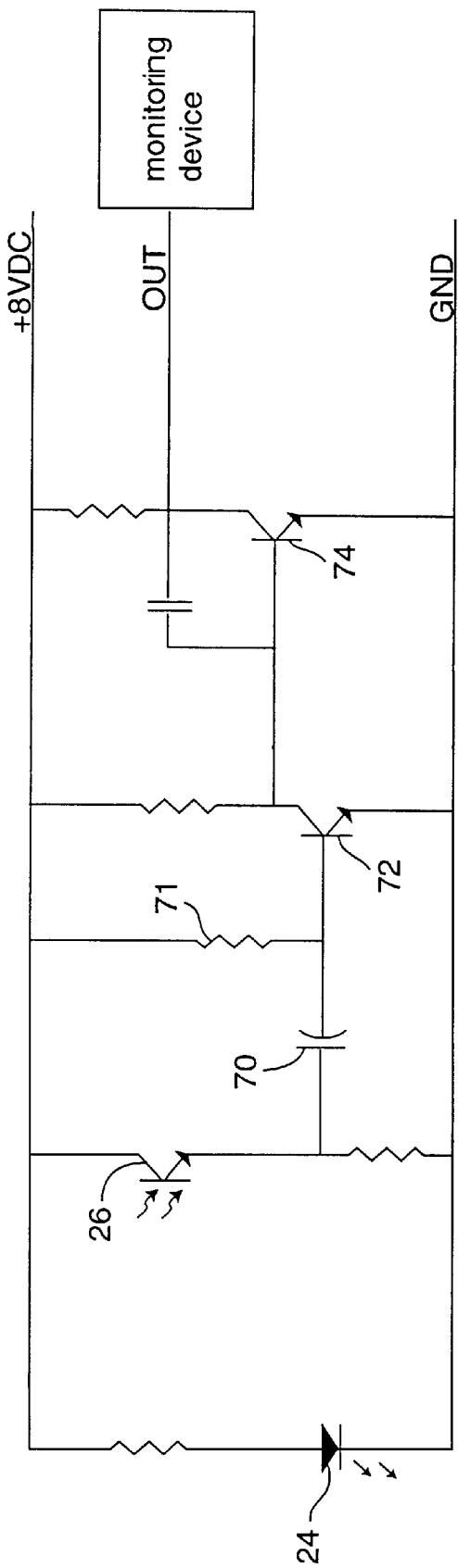
FIG. 5 is a circuit diagram of a second embodiment of the proximity sensor according to the invention.

FIG. 5 shows a circuit diagram of a second embodiment of the proximity sensor 20 according to the invention. This second embodiment of the proximity sensor is only capable of detecting seeds that travel past the detector, i.e., it is not capable of detecting seeds that are not moving. Consequently, this second embodiment of the proximity sensor cannot be placed in a container to detect whether the container is empty. An advantage of this second embodiment as compared to the first embodiment, however, is that it is a simpler circuit, has fewer parts and can be tailored to have a faster response time than the embodiment disclosed in FIG. 4. A disadvantage of this second embodiment as compared to the first embodiment is that it requires more power.

In this second embodiment of the proximity sensor, the emitter 24 and the detector 26 are adjusted just as previously described. In other words, the distance d between the sensors and the angles φ1 and φ2 can be selected to adjust the detection region and the size and shape of articles (e.g., seeds) that can be detected. In this second embodiment of the invention, however, it is preferred to use an infrared phototransistor as the detector 26 rather than an infrared photodiode because the infrared phototransistor is more responsive to the passage of seeds past the sensors. It should also be noted that this second embodiment of the proximity sensor according to the invention is not susceptible to slow changes in the intensity of ambient light.

When there are not any seeds passing the proximity sensor according to FIG. 5, the base of the transistor 72 is held high through the resistor 71 which means that the transistor 72 is "on" and acts as a short circuit. The base of the transistor 74 is connected to the collector of the transistor 72, which means that when the transistor 72 acts as a short circuit, the transistor 74 is "off" and acts as an open circuit. When the transistor 74 acts as an open circuit, its collector is high. Thus, when there are not any seeds passing the proximity sensor according to FIG. 5, the output of the proximity sensor is high.

When there are articles (e.g., seeds) passing the proximity sensor according to FIG. 5, the infrared light emitted by the IR LED 24 is reflected by the seed and detected by the phototransistor 26. The detection of the seed by the phototransistor 26 causes an increase in the amount of current passing through the phototransistor. The capacitor 70 acts as a high pass filter that filters out any slow changes in the output current of the phototransistor 26. In this manner, only a rapid change in the output current of the phototransistor, caused by a seed that travels past the sensors at a preselected minimum speed, is allowed to pass through the high pass filter 70. The signal output of the phototransistor 26 is fed to the base of the transistor 72. The transistor 72 is used to amplify the output of the IR phototransistor in the following manner.

When a seed travels past the proximity sensor, the transient increase in the output current of the phototransistor 26 passes through the high pass filter 70 and to the base of the transistor 72. The subsequent drop in the amount of current supplied to the base of the transistor 72 (after the increase in current caused by the passing seed subsides) causes the transistor 72 to turn "off" and act as an open circuit. When the transistor 72 turns "off," it acts as an open circuit and its collector is high. Once the transistor 72 turns off, the base of the transistor 74 (which is connected to the collector of the transistor 72) also goes high thus turning on the transistor 74 and causing it to acts as a short circuit. When the transistor 74 acts as a short circuit, its collector, and thus the output of the proximity sensor, is low. It can be seen therefore, that the passage of an article (e.g., a seed) past the proximity sensor causes the proximity sensor to output a negative pulse the duration of which is proportional to the size, speed and IR-reflective-susceptibility of the seed or article detected. The negative pulse outputted by the transistor 74 can be used by a monitoring device such as a computer, processor, another circuit, etc. to either acknowledge or count the presence or passage of seeds.

It should be noted that the sensitivity of the proximity sensor depicted in FIG. 5 is directly proportional to the value of the resistor 71. Thus, the larger the value of the resistor 71, the more sensitive the proximity sensor. If the sensitivity of the proximity sensor is increased too much, however, care should be taken to shield the proximity sensor from outside light sources such as fluorescent lighting.

Figure 6:
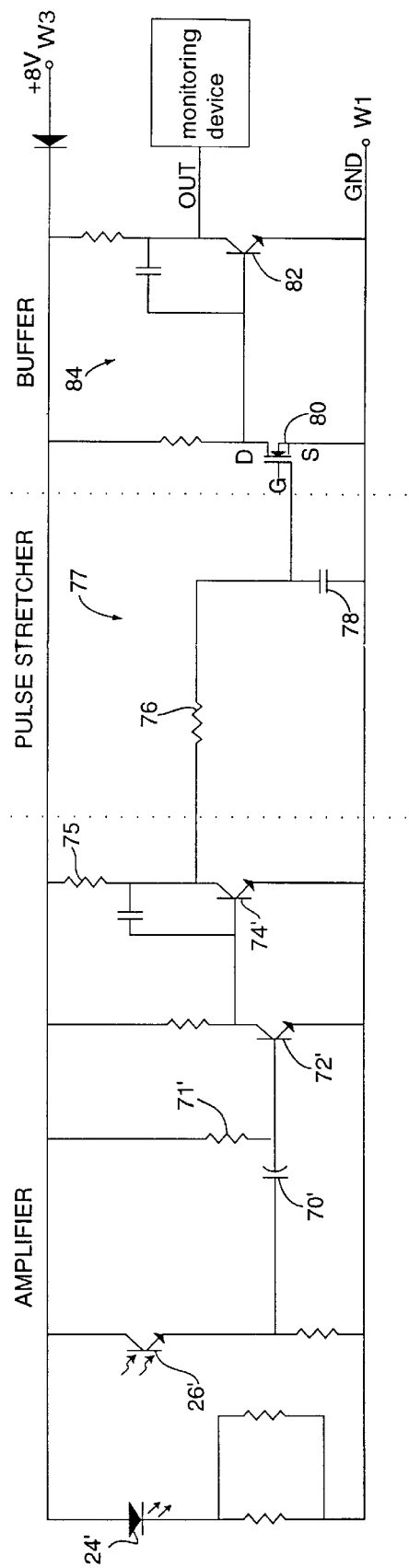
FIG. 6 is a circuit diagram of a third embodiment of the proximity sensor according to the invention.

FIG. 6 is a circuit diagram for a third embodiment of the proximity sensor according to the invention. This third embodiment of the invention is for the most part identical the second embodiment shown in FIG. 5, and the components in FIG. 6 that are the same as in FIG. 5 have been given the same numbers with a prime superscript. For example, the capacitor 70 in FIG. 5 is 70' in FIG. 6.

The main difference between the proximity sensor of FIG. 6 and the proximity sensor of FIG. 5 is that the proximity sensor of FIG. 6 incorporates a pulse stretcher to stretch the signal output of transistor 74'. Thus, the proximity sensor of FIG. 6 has an emitter 24' and a detector 26', which preferably are identical to the components described with respect to FIG. 5. The infrared light emitted by the IR LED 24' and reflected off the article to be detected (e.g., a seed) is detected by the IR phototransistor 26'. When the IR phototransistor 26' detects the reflected infrared light, the current through the IR phototransistor 26' increases. The capacitor 70' acts as a high pass filter which only allows rapid changes in the output current of the IR phototransistor to pass. The change in the output current of the IR phototransistor is amplified by the transistor 72' and 74' to produce a negative pulse in the same manner as described with respect to FIG. 5.

When the seeds, or other articles to be detected, travel past the proximity sensor at a very rapid speed, the duty cycle of the negative pulse output of the transistor 74' may not be long enough for the monitoring device to be able to determine the presence of seeds or count the number of seeds. To remedy this potential problem, the embodiment of FIG. 6 uses a pulse stretcher circuit to elongate the duty cycle of the negative pulse output representing the seed (or other article) passing the proximity sensor. The pulse stretcher circuit is comprised of resistors 75, 76 and the capacitor 78, the values of which are selected to elongate the output of the transistor 74' by the desired factor (e.g., two times, three times, etc.). Because the pulse stretcher circuit converts the negative pulse of the transistor 74' (which indicates the passage of a seed) into a positive pulse, the buffer circuit 84 is used to convert the positive pulse output of the pulse stretcher circuit 77 into a negative pulse for use by the monitoring device.

The pulse stretcher circuit 77 and the buffer circuit 84 incorporated into the proximity sensor according to FIG. 6 operate in the following manner. When there are not any articles (e.g., seeds) passing the proximity sensor, the transistor 74' is "off" and acts as an open circuit. Thus the collector of the transistor 74' is high and charges the capacitor 78 through the resistors 75, 76. As can be seen in FIG. 6, the capacitor 78 is connected to the gate of the FET 80. Assuming that a seed has not traveled past the proximity sensor recently, the capacitor 78 is fully charged, which means that the gate of the FET 80 is high and the FET 80 is "on" and acting as a short circuit. Consequently, the drain of FET 80, which is connected to the base of the transistor 82 is low. Because the base of the transistor 82 is low, the transistor is "off" and acts as an open circuit. Thus, the output of the proximity sensor which is connected to the collector of the transistor 82 is high.

When a seed passes the proximity sensor, the transistor 74' short circuits and outputs a negative pulse. The short circuit of the transistor 74' cause the capacitor 78 to discharge. The discharge in the capacitor 78 causes the gate of the FET 80 to go low, thus causing the FET to turn "off" and act as an open circuit. The open circuit in the FET 80 causes the drain of the FET 80 to go high. Consequently, the base of the transistor 82, which is connected to the drain of the FET 80, also goes high causing the transistor 82 to turn "on" and act as a short circuit. The short circuit in the transistor 82 makes the output of the proximity sensor (which is connected to the collector of the transistor 82) to be a negative pulse, which can be used by a monitoring device. The transistor 82 will remain "on" and act as a short circuit until the capacitor 78 charges enough to once again turn "on" the FET 80. Thus, in the manner described above, the pulse stretcher circuit 77 and the buffer circuit 84 stretch the negative pulse output of the transistor 74' for use by a monitoring device.

As mentioned above, the output of the proximity sensor according to the invention can be provided to a monitoring device such as a computer, a processor, another circuit, etc. for further processing (e.g., counting the number of seeds or monitoring for the presence of seeds). One exemplary monitoring device which may be used in conjunction with the proximity sensor according to the invention is the Planter Monitor 1000 manufactured by the DICKEY-john corporation of Auburn, Illinois. The Planter Monitor 1000 is capable of receiving the output of the proximity sensor according to the invention and process the signal to indicate to the user whether, for example, seeds are being planted and the appropriate rate. It is to be understood, however, that the proximity sensor according to the invention can be used with any number of monitoring devices and is not limited to the Planter Monitor 1000.

While the invention has been described in connection with certain preferred embodiments, there is no intent to limit it to those embodiments. On the contrary, it is recognized that various changes and modifications to the exemplary embodiments described herein will be apparent to those skilled in the art, and that such changes and modifications may be made without departing from the spirit and scope of the present invention. Therefore, the intent is to cover all alternatives, modifications and equivalents included within the spirit and scope of the invention as defined by the appended claims. For example, one apparent modification to the disclosed invention is to use a microprocessor as an alternative to one or more circuit components of the proximity sensor. Another modification may be to use an emitter other than an LED and a detector other than a photodiode or phototransistor. Yet another modification may be to implement the components of the proximity sensor on some medium other than a printed circuit board.

What is claimed is:

1. A proximity sensor for detecting the presence of seeds in a container and detecting the passage of seeds in a chute, the proximity sensor comprising:

an emitter capable of emitting energy waves of a preselected wavelength;

a detector disposed adjacent to said emitter, capable of detecting reflected energy waves from said emitter of said preselected wavelength and generating an output signal in response to detecting energy waves having said preselected wavelength; and a phase lock loop circuit operatively connected to the emitter and the detector for driving the emitter at said preselected frequency and generating a count signal representative of the number of seeds when the frequency of the output signal received from said detector matches the frequency at which the emitter is driven.

2. The proximity sensor of claim 1, wherein the emitter is an infrared emitter whereby the energy waves of the preselected wavelength emitted by the infrared emitter are within the infrared spectrum.

3. The proximity sensor of claim 2, wherein the detector is an infrared detector and the energy waves of preselected wavelength detected by the infrared detector are within the infrared spectrum.

4. The proximity sensor of claim 3, wherein the infrared emitter emits infrared light with a wavelength within a range of approximately 880 nm to 940 nm.

5. The proximity sensor of claim 4, wherein the infrared detector detects infrared light with a wavelength within a range of approximately 880 nm to 940 nm.

6. The proximity sensor of claim 5, wherein the phase lock loop circuit drives the infrared emitter at a frequency of 10 kHz.

7. The proximity sensor of claim 6, wherein a distance between the infrared emitter and the infrared detector is approximately between 0.555 cm and 0.714 cm.

8. The proximity sensor of claim 7, further including a printed circuit board wherein the emitter and detector are coupled to the printed circuit board such that centerlines through the emitter and detector form angles 1 and 2 respectively with respect to the printed circuit board and wherein the angle 1 between the emitter and the printed circuit board and the angle 2 between the detector and the printed circuit board are both approximately 90 degrees.

9. The proximity sensor of claim 3, wherein the infrared emitter emits infrared light with a wavelength of approximately 940 nm.

10. The proximity sensor of claim 9, wherein the infrared detector detects infrared light with a wavelength of approximately 940 nm.

11. The proximity sensor of claim 10, wherein the infrared emitter is a distance of approximately 0.635 cm away for the infrared detector.

12. The proximity sensor of claim 3, wherein the infrared emitter is an infrared light emitting diode.

13. The proximity sensor of claim 3, wherein the infrared detector is a photodiode capable of detecting light in the infrared spectrum.

14. The proximity sensor of claim 3, wherein the infrared detector is a phototransistor capable of detecting light in the infrared spectrum.

15. The proximity sensor of claim 3, wherein the infrared emitter and the infrared detector are a photo/reflective pair.

16. A proximity sensor for detecting the passage of seeds in a chute, the proximity sensor comprising:
   an emitter for emitting energy waves of a preselected wavelength; and
   a detector circuit including a detector for detecting energy waves from said emitter and generating an output pulse having a pulse width representative of the size and speed of the seeds in the chute in response to energy waves emitted by the emitter and reflected from the seeds, wherein said detector is disposed adjacent to said emitter.

17. The proximity sensor as recited in claim 16, further including a pulse stretching circuit for lengthening the duty cycle of said output pulse.

18. The proximity sensor of claim 16, wherein the emitter and the detector are a photo/reflective pair.

19. The proximity sensor of claim 16, wherein the emitter emits energy waves in the infrared spectrum.

20. The proximity sensor of claim 19, wherein the detector detects energy waves in the infrared spectrum.

21. The proximity sensor as recited in claim 16, wherein said detector circuit includes a filter for filtering out predetermined wavelengths.

* * * * *